Oct. 9, 1928.
A. E. GREENE
SEAM PRESSING MACHINE
Filed March 30, 1925
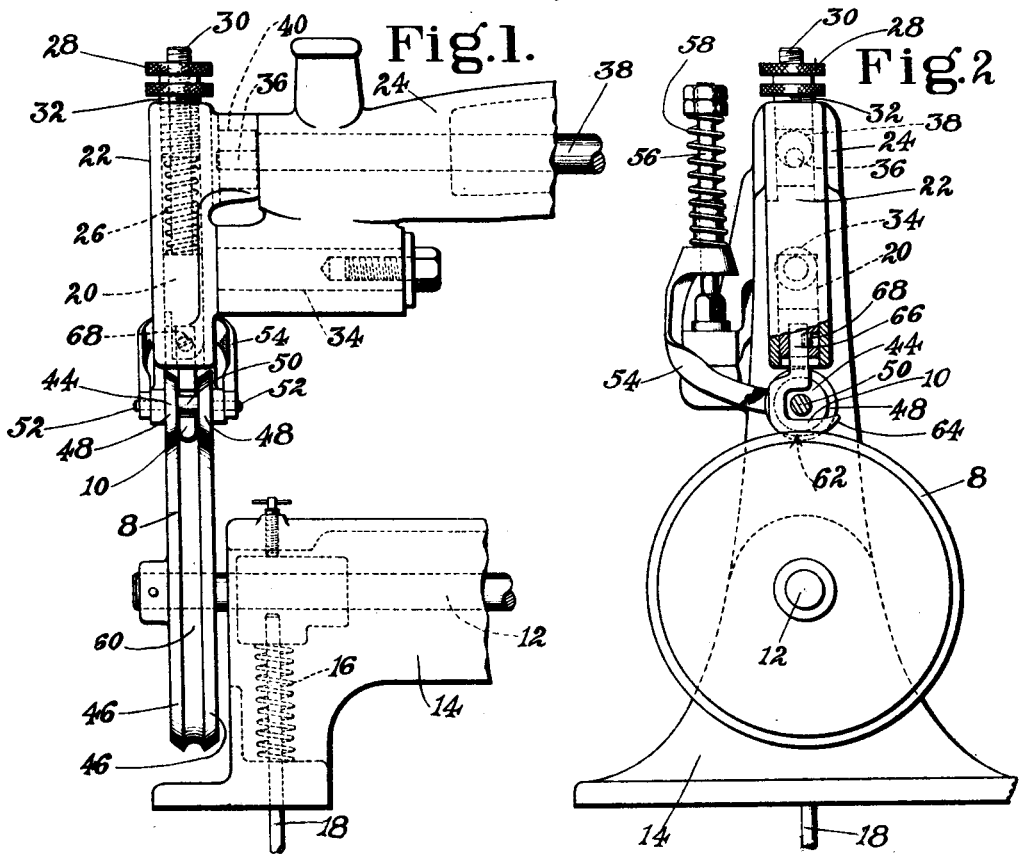
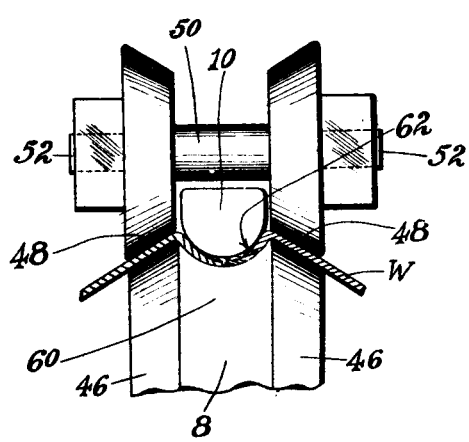
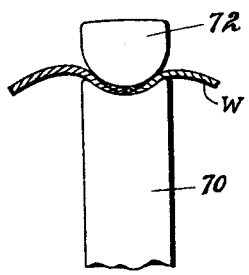

Patented Oct. 9, 1928.

1,686,810

UNITED STATES PATENT OFFICE.

ARTHUR E. GREENE, OF ENDICOTT, NEW YORK, ASSIGNOR TO UNITED SHOE MACHINERY CORPORATION, OF PATERSON, NEW JERSEY, A CORPORATION OF NEW JERSEY.

SEAM-PRESSING MACHINE.

Application filed March 30, 1925. Serial No. 19,341.

This invention relates to pressing machines and is herein illustrated as embodied in a machine for pressing seams formed in the uppers of boots and shoes although in various aspects the invention is not limited to embodiment in a machine of this type.

In one form of seam pressing machine which has been generally used, the work is fed over the peripheral face of a work supporting feed wheel and the seam is pressed against the feed wheel by a rubbing tool arranged to vibrate or reciprocate in the direction of work feed. Such machines, frequently termed seam rubbing machines, have usually been provided also with means in the nature of a plow, which is located in advance of the rubbing tool, for spreading or opening up the seam, and with guide fingers, or the like, for engaging the opposite margins of the unopened portion of the seam to guide the seam so that it will be properly presented to the rubbing tool. Some operatives, however, feel that it facilitates speed and convenience of operation to discard the seam guiding fingers and to rely entirely upon manual guidance of the work as it is fed past the rubbing tool. To guide the work manually in this manner the operative grasps it at opposite sides of the seam, holding the work under more or less tension, and thus subjects the seam to more or less lateral pulling stress. Such procedure is not entirely satisfactory, principally because of the undesirable stretching of the seam which is liable to cause the seam to be more or less wavy after it has been rubbed, and which renders it difficult to obtain uniform results upon different pieces of work.

Accordingly, one object of the present invention is to avoid the production of inferior or imperfect work such as may be caused by ineffective or improper guidance of a seam while it is being operated upon in a seam rubbing machine.

This object is attained, in accordance with one feature of the present invention, by providing a work support and a vibrating or reciprocating pressing tool, such as a seam rubbing tool, which are respectively constructed and relatively arranged to press the work as it is fed over the support and to form a temporary depression in the work to receive the rubbing tool to facilitate the guiding of the work in a straight path. In the illustrated embodiment of the invention the work support comprises a driven feed wheel formed with a circumferential groove affording a transversely concave peripheral face for supporting the work, and the reciprocating pressing tool is formed with a convex work-engaging face shaped to correspond to the transverse curvature of the circumferential groove in the feed wheel and adapted to press a seam into said groove as the work is fed, thereby forming a temporary trough-like depression or groove in the portion of the work which is to be operated upon. Thus, as the rubbing tool reciprocates it moves back and forth in the depressed portion of the work along the bottom of which extend the free edges to be pressed, and the rubbing tool co-operates with the opposite sides of the depression to guide the seam to and past the point of rubbing contact between the rubbing tool and the feed wheel without any tendency to skew the seam and make it wavy. Such a rubbing tool, having its work-engaging face convexly curved transversely with respect to a seam which is being fed thereto, is well adapted to spread or open the seam before pressing it and it may be relied upon to perform a seam opening function if desired without the employment of a plow or other independent opening device.

The above and other features of construction and combinations of parts will be described as embodied in an illustrative machine and pointed out in the appended claims.

Referring now to the accompanying drawings:

Fig. 1 is a view in side elevation showing so much of a seam rubbing machine as is necessary to illustrate the application of the present invention thereto;

Fig. 2 is a view, partially in front elevation and partially in section, of the parts shown in Fig. 1;

Fig. 3 is a detail side elevational view on an enlarged scale showing the work supporting, feeding and pressing means and illustrating their mode of operation upon the work; and Fig. 4 is a detail side elevational view showing an alternative form of the work supporting and feeding and seam rubbing instrumentalities.

In the drawings the work supporting feed wheel is indicated at 8 and the vibrating or reciprocating pressing or rubbing tool at 10, and both the feed wheel and pressing tool are mounted and actuated in the same manner as that disclosed in United States Letters Patent No. 386,241, granted July 17, 1888, to C. S. Fifield, to which reference may be had for details of construction of the machine not fully described thereon. For present purposes it will be sufficient to describe the construction and mode of operation of the machine briefly as follows:

The feed wheel 8 is fixed upon a horizontal driven shaft 12 which is so mounted in suitable bearings in a frame 14 that the feed wheel is yieldingly maintained, by means of a spring 16, in position to support the work in operative relation to the pressing tool and is adapted to be depressed, through the action of a treadle rod 18, to permit insertion and removal of the work. The pressing tool 10 is fixedly secured to a holder 20 which is mounted in an oscillatory head 22 supported by an overhanging upper arm portion 24 of the frame 14. The tool holder 20 is arranged to yield upwardly in a guideway in the head 22 against the action of a spring 26 while downward movement of the tool holder is limited by a stop collar 28 which is threaded upon the upper end of a stem 30 rising from the holder 20 and which engages a fixed but adjustable sleeve 32 through which the stem 30 is capable of sliding freely. To permit oscillatory movement of the head 22 a horizontal stud 34 projects from the head and is journaled in the frame arm 24. The head 22 is oscillated by an eccentric pin 36 carried by a driven horizontal shaft 38 journaled in the frame arm 24, the eccentric pin being received in a block 40 which is slidable within a vertical slot in the head 22.

To provide for effective feeding of the work a rotary presser-foot 44 is provided for co-operating with beveled faces 46, 46 formed at opposite sides of the periphery of the work supporting feed wheel 8. As shown, the presser-foot is in the form of a spool comprising two disk-like heads 48, 48 which are joined by a central core 50, the heads 48, 48 having their peripheries beveled at an angle corresponding to that of the beveled faces 46, 46 on the feed wheel. The spool-like presser-foot 44 is provided with trunnions 52 which are journaled in the forked lower extremity of a curved arm 54 and the latter is mounted on a vertical rod 56 carried by the frame arm 24. A spring 58 on the rod 56 urges the presser-foot yieldingly into operative engagement with the feed wheel 8. The construction of the presser-foot 44, as well as that of the feed wheel 8 and the pressing tool 10, may be, and is shown as being, substantially the same as that of the corresponding parts described in the Fifield patent hereinbefore referred to.

The illustrated feed wheel 8 is formed with a circumferential groove 60 and the rubbing tool 10 is formed with a convex lower work-engaging face 62 curved to correspond to the transverse curvature of the grooved periphery of the feed wheel. The work-engaging face 62 of the rubbing tool is elongated in the direction of work feed and is formed on a substantially horizontally disposed foot 64 which extends substantially at right angles to the lower portion of an upright shank 66. The shank 66 of the rubbing tool is received in a socket in the holder 20 and is secured therein by means of a set-screw 68. As shown, the lower portion of the shank 66 is offset laterally, as shown in Fig. 2, to enable the rubbing tool to oscillate without interfering with the central core 50 of the spool-shaped presser-foot.

When a piece of work is to be operated upon, the feed wheel 8 is depressed by means of a treadle connected with the treadle rod 18 so as to separate the feed wheel from the presser-foot and the rubbing tool sufficiently to permit the introduction of the work. The work is presented to the machine with the seam in line with the rubbing tool and resting in the groove at the top of the feed wheel. Upon release of the treadle the seam is yieldingly engaged between the rubbing tool and the grooved periphery of the feed wheel while the portions of the work adjacent to the seam at either side thereof are yieldingly engaged between the disk-like portions 48, 48 of the presser-foot and the beveled faces 46, 46 of the feed wheel. The portion of the work which contains the seam is forced into the groove of the feed wheel by means of the rubbing tool so that the temporary depression or groove is formed in the work. If the work is properly presented to the machine with the seam centralized with respect to the feed wheel and extending in line with the length of the rubbing tool the portion of the seam which is about to be operated upon by the rubbing tool will be contained within the depression in the work and will extend along the lowest portion of the depression.

The presser-foot 44 holds the work in yielding engagement with the beveled faces of the feed wheel in the usual manner so that the rotation of the feed wheel positively advances the work, and as the work is fed the seam is rubbed by the reciprocating rubbing tool which co-operates with the wheel 8 to press or flatten out the margins of the seam. Inasmuch as the seam is caused to ride in the groove as it is fed over the feed wheel, the tendency of the seam to be displaced to one side or the other is reduced to a minimum. The length of the rubbing tool in the direction of feed is such that the transversely curved face of the tool bears against the sides of the longitudinally straight channel or groove and thus tends at all times to guide the work in a straight path so that the action of the rubbing tool will be the same throughout the length of the seam. If the seam is properly located with respect to the rubbing tool when it is first presented thereto, it has been found in practice that the seam will advance in a straight path without any assistance upon the part of the operative and without the aid of any independent guiding means.

A plow may be used, if desired, for opening the seam in advance of the rubbing tool. With many classes of work, however, the rubbing tool itself may be relied upon effectively to open the seam, the transverse curvature of the lower side of the rubbing tool adapting the tool to perform a seam opening function.

By reason of the above described action of the rubbing tool in guiding the work it becomes unnecessary to provide guiding fingers or other special guiding means for this purpose, thus simplifying the construction of the machine to a substantial extent. If the rubbing tool is also relied upon to open the seam, the machine may be further simplified by the omission of the plow or other special seam opening device.

For certain classes of work it may be desirable further to simplify the machine by discarding the rotary presser-foot. When used without the presser-foot, the operative parts will appear as shown in Fig. 4 wherein the work supporting feed roll is designated 70 and the rubbing tool 72. In this figure, and also in Fig. 3, the work is indicated at W.

In using the machine without a rotary presser-foot or equivalent device, the operative may manually assist the feed of the work but the work will be effectively guided by the action of the machine independently of the operative, with the result that the operative, who holds the work at opposite sides of the feed wheel, will not be obliged to exert any pulling strain upon the work in any direction transverse to the direction of feed. Accordingly, there will be no tendency whatever to stretch the seam or otherwise interfere with the proper action of the seam pressing means.

Having thus described my invention, what I claim as new and desire to secure by Letters Patent of the United States is:

1. In a machine of the class described, a work support over which a piece of work is to be fed, and a reciprocating tool co-operating with the work support to press the work while it is being fed, said support and said tool being respectively constructed and relatively arranged to form a temporary depression in the work to receive said tool to facilitate the guiding of the work in a straight path.

2. In a machine of the class described, a circumferentially grooved wheel over which a piece of work is to be fed, and a reciprocating tool constructed and arranged to press the work into the groove of the wheel to form a temporary groove in the work to facilitate the guiding of the work in a straight path and to rub the work lengthwise of the corrugation.

3. In a machine of the class described, a circumferentially grooved feed wheel arranged to support a piece of work, a rubbing tool having a work-engaging face shaped to fit within the grooved face of the feed wheel and co-operating with the latter to form a temporary trough-like depression in the work to facilitate the guiding of the work in a straight path, and means for reciprocating the tool.

4. In a seam rubbing machine, a feed wheel having a circumferentially grooved portion for supporting a seam, a presser member for holding portions of the work at opposite sides of the seam in engagement with the feed wheel, and means shaped to conform to the contour of the groove in the feed wheel and arranged to co-operate with the feed wheel to press the seam and to form a depression in the work to facilitate guidance of the work relatively to the pressing means as the work is fed.

5. In a seam rubbing machine, a feed wheel having a circumferentially grooved portion for supporting a seam, a presser member for holding portions of the work at opposite sides of the seam in engagement with the feed wheel, and an actuated seam pressing member having a transverse convex surface shaped to fit within the groove in the feed wheel and having a movement opposite to the direction of work feed for operating upon the portion of the work resting upon the feed wheel.

6. In a machine of the class described, in combination, a feed roll, and a tool reciprocating in the direction of work feed and co-operating to press the work and to maintain the work in the form of a trough extending in the direction of feed while the work is being pressed.

7. In a machine of the class described, in combination, means affording a trough-like support over which the work is fed, and means movable relatively to the work at the point of engagement therewith for pressing the work into the trough of the support and rubbing the work, said means co-operating with said support to maintain the work in the form of a trough as it is fed over the support.

8. In a machine of the class described, in combination, a feed roll, and means co-operating therewith for forming a temporary channel or groove in the work, said means comprising a tool movable back and forth along the groove for rubbing the work.

9. In a machine of the class described, in combination, a feed roll having a transversely concave periphery for supporting the work, and a reciprocating rubbing tool having a convex rubbing face shaped to fit within the periphery of the feed roll for engaging the portion of the work resting upon the feed roll.

In testimony whereof I have signed my name to this specification.

ARTHUR E. GREENE.